Dec. 23, 1969     H. KOMENDOWSKI     3,485,123
BRUSH-TYPE CLEANING DEVICE FOR BAND SAWS
Filed Sept. 19, 1966
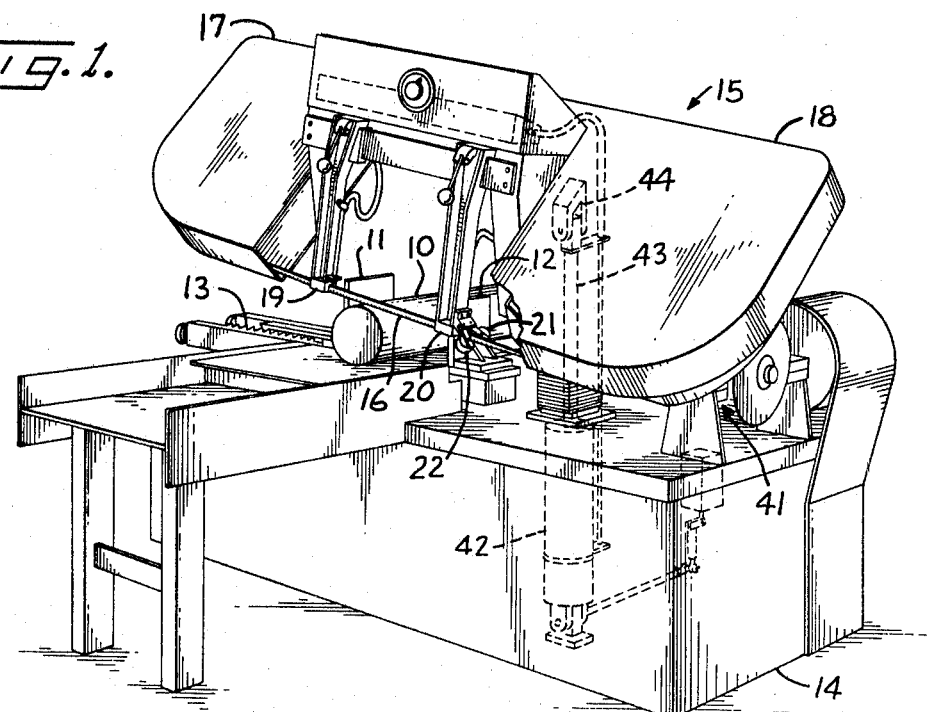
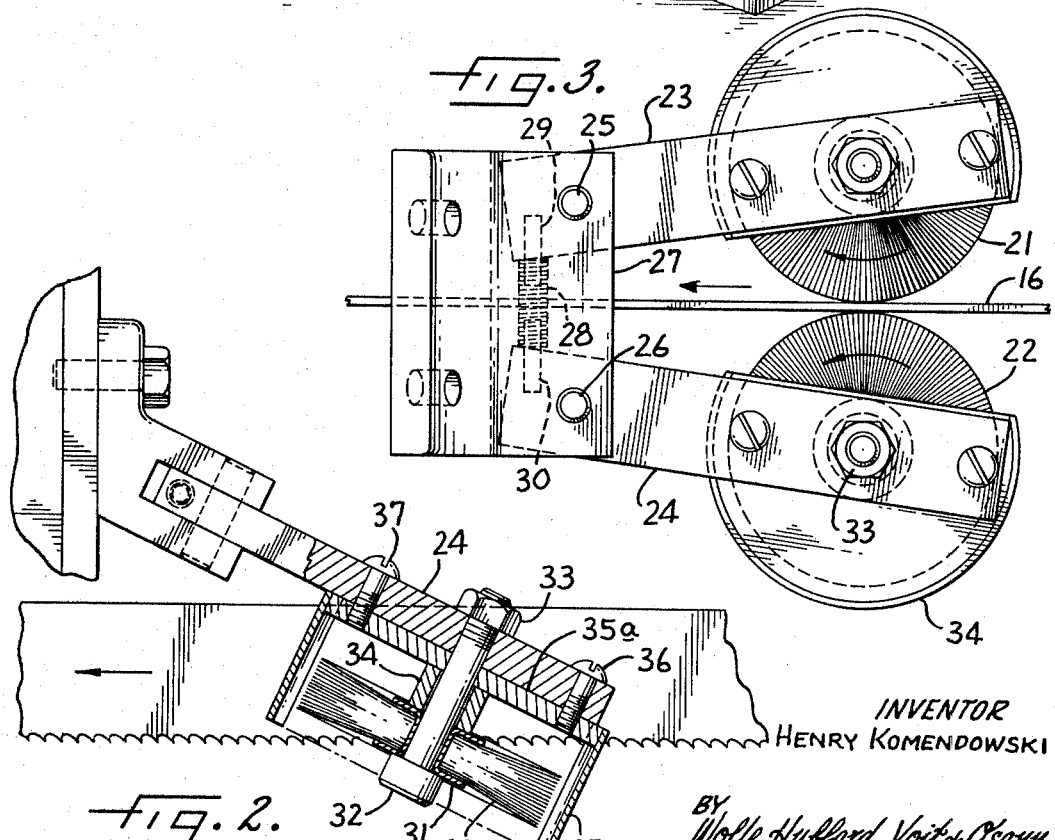
INVENTOR
HENRY KOMENDOWSKI
BY
Wolfe, Hubbard, Voit & Osann
ATTORNEYS.

United States Patent Office 3,485,123
Patented Dec. 23, 1969

3,485,123
BRUSH-TYPE CLEANING DEVICE FOR BAND SAWS
Henry Komendowski, Chicago, Ill., assignor to Armstrong-Blum Manufacturing Company, Chicago, Ill., a corporation of Illinois
Filed Sept. 19, 1966, Ser. No. 580,412
Int. Cl. B26d 7/08
U.S. Cl. 83—168       2 Claims

ABSTRACT OF THE DISCLOSURE

An improved cleaning device for a band saw, the device including a pair of rotatable brushes mounted on opposite sides of the running band saw blade. The two brushes are mounted on two independently pivoted supporting members so that the brushes may be moved transversely of the blade. A spring or other biasing means is associated with the supporting members for urging the brushes against opposite sides of the blade so that the brushes are self-adjusting.

---

The present invention relates generally to band saws and, more particularly, to an improved cleaning device for continuously cleaning a running band saw blade.

It is a primary object of the present invention to provide an improved brush-type cleaning device for a running band saw blade which is self-adjusting so as to maintain effective cleaning action without manual adjustment of the brushes to compensate for wear. A related object is to provide such a cleaning device which provides good mechanical cleaning action with a long operating life for both the cleaning device and the blade. In this connection, it is another object to provide a brush-type band saw cleaner in which the brushes are not subject to rapid wear.

It is another object of this invention to provide an improved band saw cleaning device of the foregoing type which is economical to manufacture and maintain. A related object is to provide such a cleaning device which does not require any fluid supply or recirculation system.

A further object of the invention is to provide an improved band saw cleaning device of the type described above which does not require any supplementary drive system for the brush-type cleaners. Still another object is to provide such a cleaning device which does not subject the running band saw blade to any severe abrading action.

Other objects and advantages of the invention will become apparent from the following description and upon reference to the accompanying drawings, in which:

FIGURE 1 is a perspective view of a horizontal hinge-type band saw including a blade cleaning device embodying the present invention;

FIG. 2 is an enlarged side elevation, partially in section, of the cleaning device included in the band saw of FIGURE 1; and FIG. 3 is an enlarged top plan of the cleaning device shown in FIG. 2.

While the invention is described in connection with certain preferred embodiments, it will be understood that it is not thereby intended to limit the invention to those embodiments. On the contrary, it is intended to cover all alternatives, modifications and equivalents as may be included within the spirit and scope of the invention as defined by the appended claims.

Turning now to the drawings, a hydraulic, hinge-type, horizontal band saw is shown for making repetitive high speed cuts through an elongated workpiece 10. The workpiece is fed into the band saw along a horizontal table by means of conventional feeding mechanism such as a feed shuttle. During the cutting operation, the workpiece is held firmly in position by means of a hydraulically operated vise including a pair of opposed jaws 11 and 12. Hydraulic clamping pressure is applied to the left-hand jaw 11, as viewed in FIG. 1, through a ratchet 13 powered by an integral hydraulic cylinder. If desired, a screw adjustment may be provided on the piston rod associated with the hydraulic cylinder for permitting reduction of clamping pressure to prevent distortion of light gauge workpieces.

The workpiece table and feed mechanism of the illustrative band saw are mounted on a supporting frame or base member 14, which also supports one end of the saw head 15. The saw head 15 includes the conventional pair of horizontally spaced band wheels carrying a continuous band saw blade with an exposed length 16 of the blade being disposed directly over the work table. A head frame carries the two band wheels for rotation inside two spaced housing sections 17 and 18, with the right-hand wheel, inside the housing section 18, being driven by a suitable motor. For the purpose of guiding the exposed length 16 of the band saw blade, a pair of similar guide members 19, 20 depend from the head frame and fit over the blade 16 at opposite sides of the work table. These guide members 19, 20, which also provide backup support for the blade 16, are preferably of the type described in U.S. Patent No. 2,914,101, "Saw Blade Backstop," so as to provide accurate guidance along with a long operating life.

In order to permit the saw head 15 to be raised and lowered with respect to the work table, for cutting the workpiece, one end of the head is hinged to the base member 14, as at 41 in FIG. 1. The raising and lowering of the head is effected by a hydraulic cylinder 42 anchored to the machine base 14, this cylinder also serving as a support for the saw head. Hydraulic pressure within the cylinder 42 controls the operation of a piston rod 43 which extends upwardly from the cylinder 42 and is secured at its upper end to the head frame via a bracket 44. Consequently, as the piston rod 43 is advanced, it tilts the head 15 upwardly about its hinged connection to the base 14, so that the band saw blade 16 is moved upwardly, i.e., retracted from the work table. Conversely, when the piston rod 43 is retracted, the head 15 is lowered or advanced toward the work table. A suitable control system for automatically raising and lowering the saw head during a repetitive cutting operation is described in a copending application Ser. No. 580,262, entitled Feed Pressure Control System for Horizontal Band Saw filed concurrently herewith and assigned to a common assignee.

In accordance with one aspect of the present invention, a pair of rotatable brushes are mounted on opposite sides of the running band saw blade on a pair of independent supporting members mounted for pivotal movement so that the brushes may be moved transversely of the blade, and biasing means are associated with the independent supporting members for urging the brushes against the opposite sides of the blade so that the brushes clean the running blade while being rotated thereby. Thus, referring to FIGS. 1 through 3, a pair of small cylindrical brushes 21, 22 are journaled on a pair of independent supporting arms 23, 24 which are pivotally mounted on a pair of pins 25, 26 held by a rigid bracket 27, the bracket being secured to one of the guide members 20 by a plurality of machine screws.

For the purpose of biasing the brushes 21, 22 against opposite sides of the cutting edge of the running blade 15, the inner ends of the supporting arms 23, 24 project past the pivot pins 25, 26 for cooperation with a biasing spring 28 fitted over a pair of projecting pins 29, 20 provided on the two arms. The compressed coil spring 28 acts to bias the inner ends of the two supporting arms 23, 24 away from each other so as to swing the two arms 23, 24 around the pivot pins 24, 25 and thereby urge the two brushes 21, 22 mounted on the opposite ends of the arms toward each other and against the opposite sides of the running band saw blade. Consequently, the brushes are self-adjusting since the continuous biasing action of the spring maintains the brushes firmly against the running blade regardless of the degree of wear on the brushes. Thus, the running blade is continuously cleaned by the mechanical action of the brushes rubbing against the blade, while the brushes are continually rotated, in the directions indicated by the arrows in FIG. 3, by the running blade. Moreover, since the brushes are simply biased against the blade, with the only drive being supplied by frictional engagement of the brushes with the blade being cleaned, neither the brushes nor the blade is subjected to any severe abrading action. The brushes are free to yield in response to any unusual pressure encountered in actual operating conditions due to blade deflections, excessive collections of foreign matter, and the like, so that both the brushes and the blade have a long operating life.

One particular construction for journaling the two brushes 21, 22 on the supporting arms 23, 24 is illustrated in FIG. 2, although it is to be understood that many other suitable structures could be designed to accomplish the same purpose. Referring to FIG. 2, the brush 22 includes an annular channel member 31 which is fitted over the shank of a bolt 32 secured to the supporting arm 24 by means of a nut 33, with the brush being spaced away from the arm by means of a spacer sleeve 34. The brush 22 is partially enclosed with an arcuate shield 35, which is secured to the supporting arm 24 by means of an anchor plate 35a and a pair of machine screws 36, 37. It will be understood that the other brush 21 is assembled in the same manner.

While the cleaning brush assembly has been illustrated as being mounted adjacent the cutting zone, on the downstream side with respect to the direction of blade movement, it will be appreciated that the same cleaning arrangement could be mounted at other points around the path of the saw blade.

To replace the brushes, the nut 33 is simply removed to permit withdrawal of the bolt 32. The worn brush is then slipped off the bolt and replaced with a new brush, after which the bolt is re-inserted through the spacer sleeve 34, the anchor plate 35, and the supporting arm 24 and fastened thereto by the nut 33. Thus, the entire replacement operation can be completed in a matter of minutes so that the machine down time is minimal. It should also be noted that the entire cleaning assembly can be made from just a few inexpensive parts so that the device can be manufactured economically and efficiently. Also, the device can be easily installed on old machines to replace more costly or less effective cleaning devices used heretofore.

In performance tests under actual operating conditions, the cleaning brush arrangement provided by this invention has been found to be extremely effective in cleaning the running blade, and yet the operating life of the brushes is considerably longer than in any brush type cleaner proposed heretofore. The brushes are self-adjusting, being maintained against the running blade by the continuous bias regardless of the degree of wear on the brushes, i.e., with any brush diameter. It is believed that this superior operating performance of the present arrangement is due to the fact that the brushes are driven only by the running blade, and can be displaced laterally away from the blade by the application of any force sufficient to overcome the biasing force of the coil spring 28, so that there is never any severe abrading action between the brushes and the saw blade.

I claim as my invention:

1. In a band saw having a pair of spaced band wheels carrying a continuous band saw blade, the combination comprising a pair of rotatable brushes mounted on opposite sides of the running band saw blade, a pair of independent supporting members each of which carries one of said brushes, said supporting members being mounted for pivotal movement whereby said brushes may be moved transversely of said blade, and biasing means associated with said supporting members for biasing one pair of opposed ends of said supporting members away from each other thereby pivoting the other pair of opposed ends of said supporting members toward each other for urging said brushes against the opposite sides of said blade so that the brushes are self-adjusting and clean the running blade while being rotated thereby.

2. In a band saw having a pair of spaced band wheels carrying a continuous band saw blade, the combination comprising a pair of supporting members mounted on opposite sides of the band saw blade, a pair of circular brushes each of which is rotatably mounted on one of said supporting members so that the brushes are disposed on opposite sides of the cutting edge of the band saw blade, and biasing means associated with said supporting members for biasing one pair of opposed ends of said supporting members away from each other thereby pivoting the other pair of opposed ends of said supporting members toward each other for urging said brushes against the blades so that the brushes are rotated by the blade while it is running whereby the brushes are self-adjusting and the running blade is continuously cleaned by the brushes without any severe abrading action between the brushes and the blade so as to provide a long operating life for both the brushes and the blade.

References Cited

UNITED STATES PATENTS

| | | | |
|---|---|---|---|
| 1,438,540 | 12/1922 | McKenna | 143—158 |
| 3,125,919 | 3/1964 | Barker | 83—201 |
| 2,081,033 | 5/1937 | Biro. | |
| 3,295,400 | 1/1967 | Anderson | 83—168 X |

ANDREW R. JUHASZ, Primary Examiner